Patented Sept. 26, 1922.

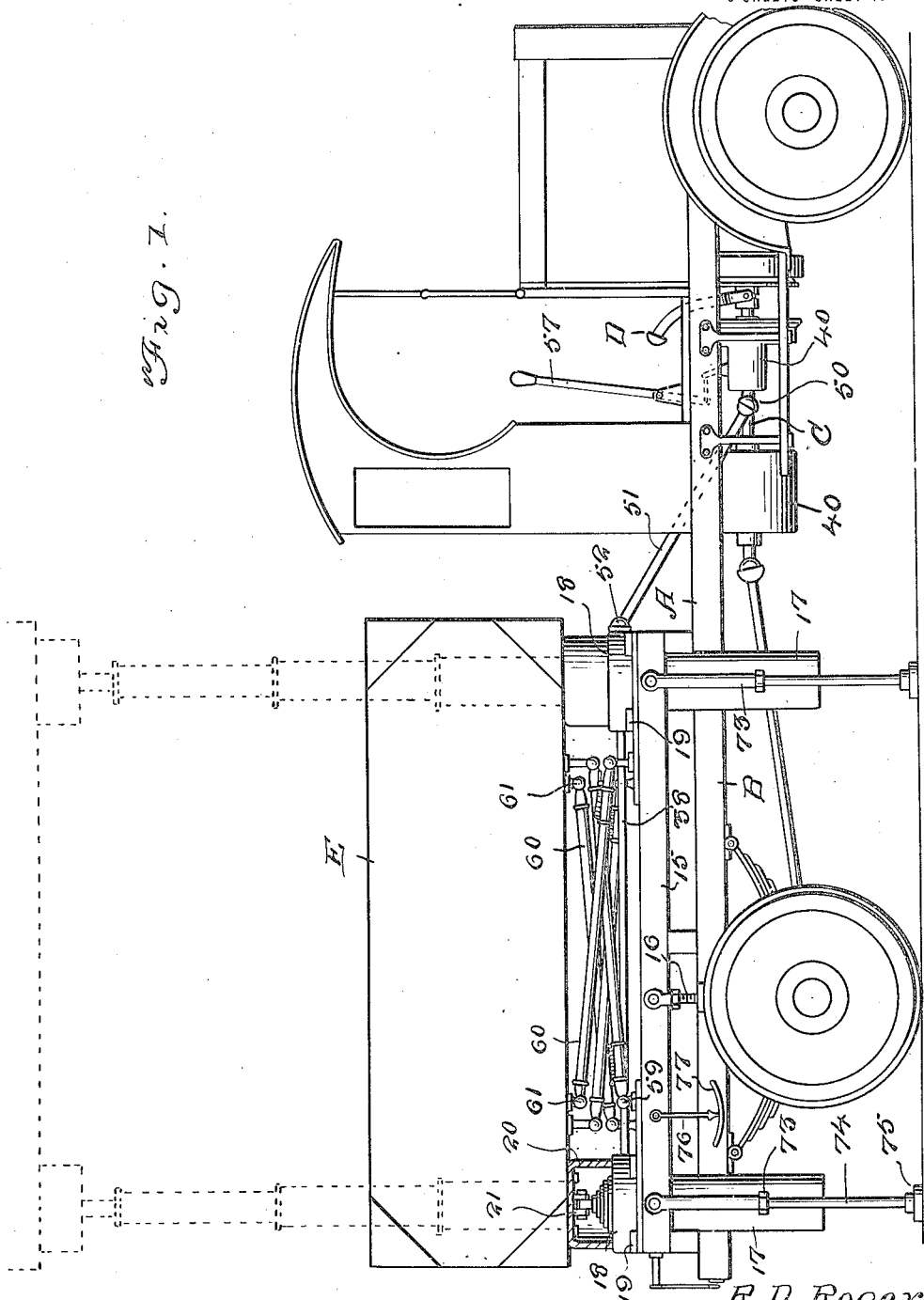

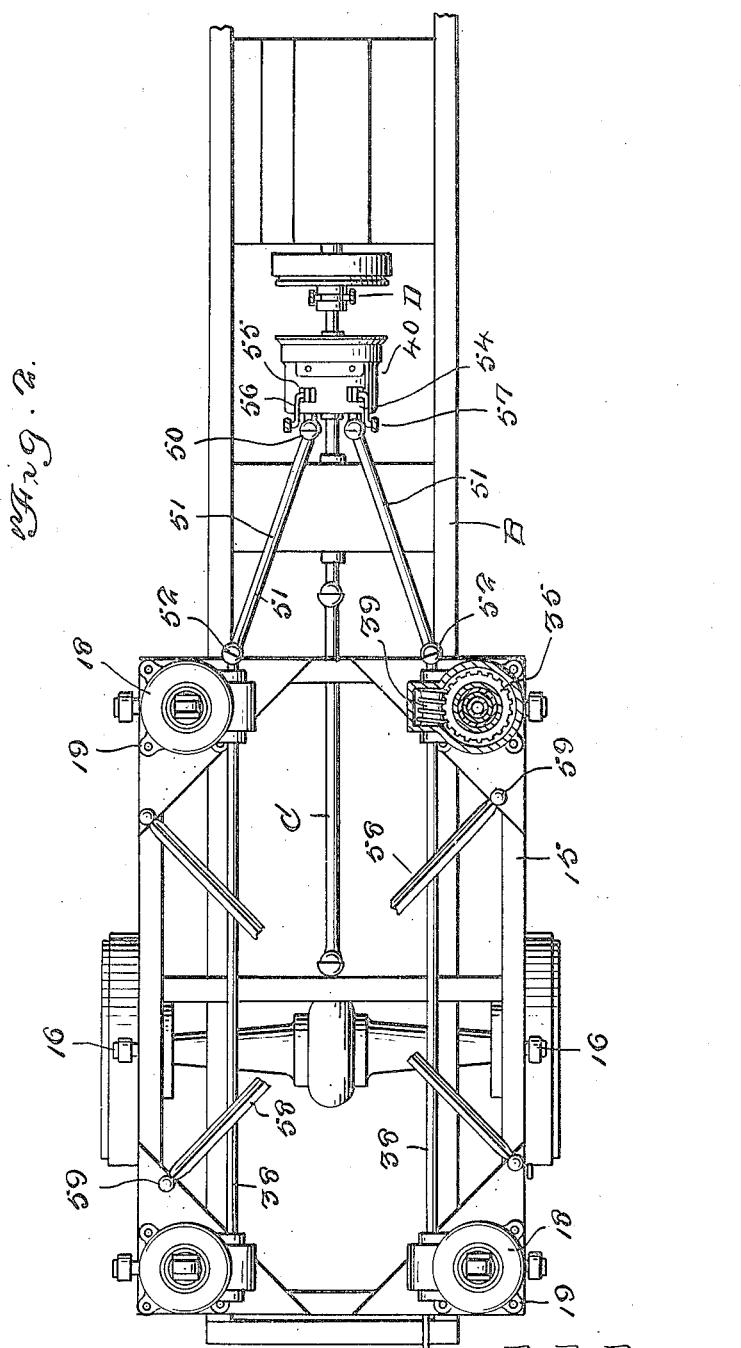

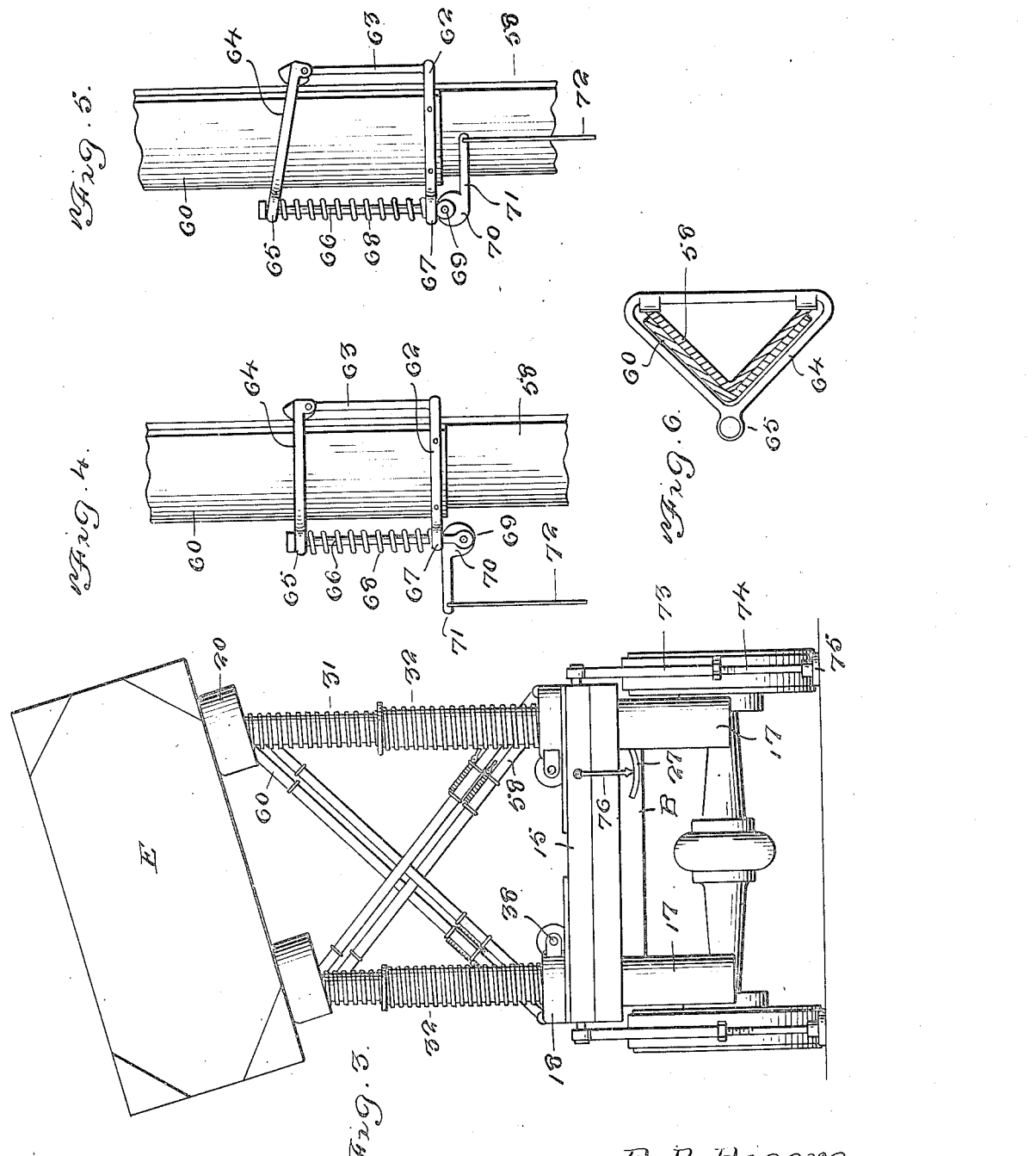

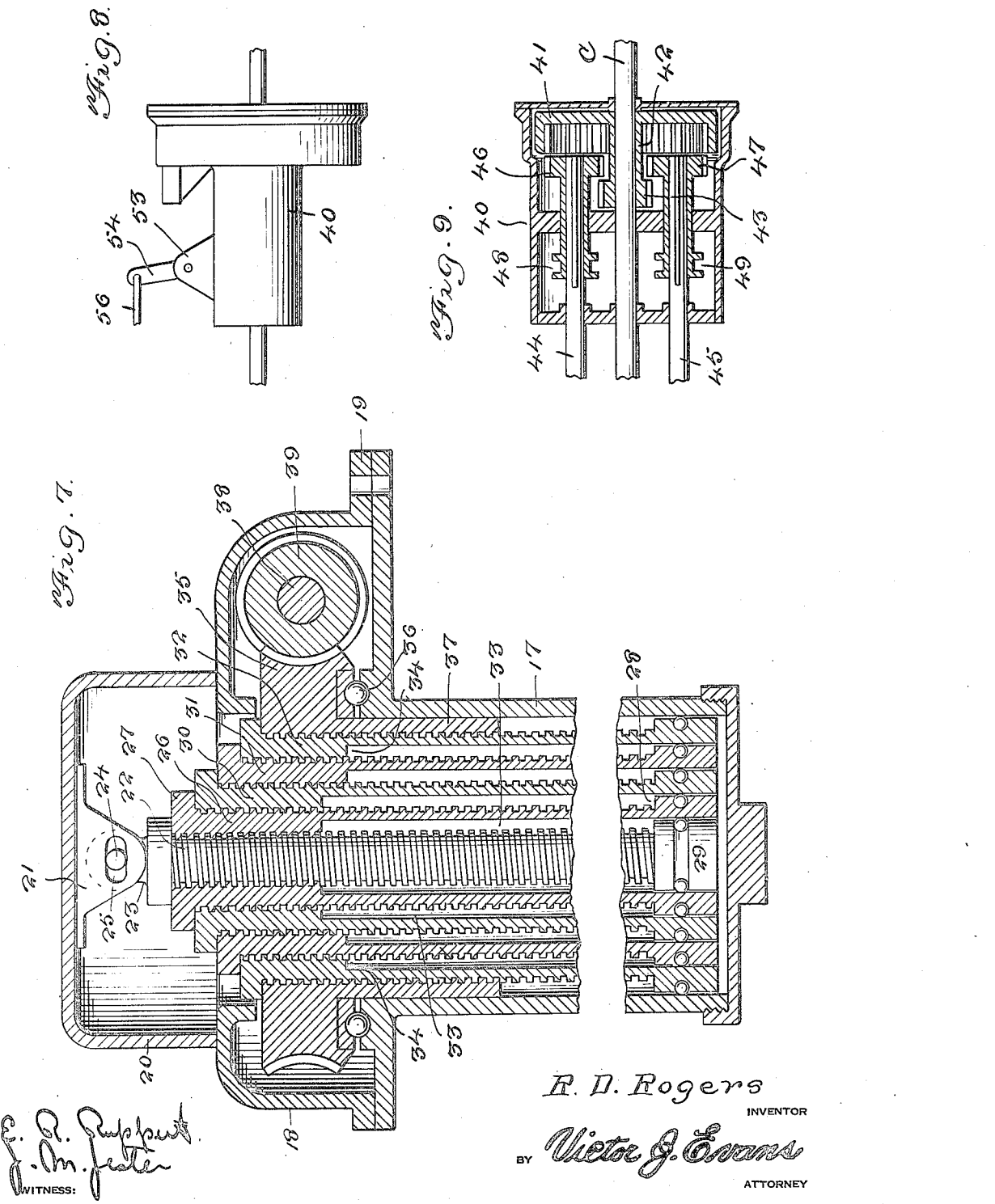

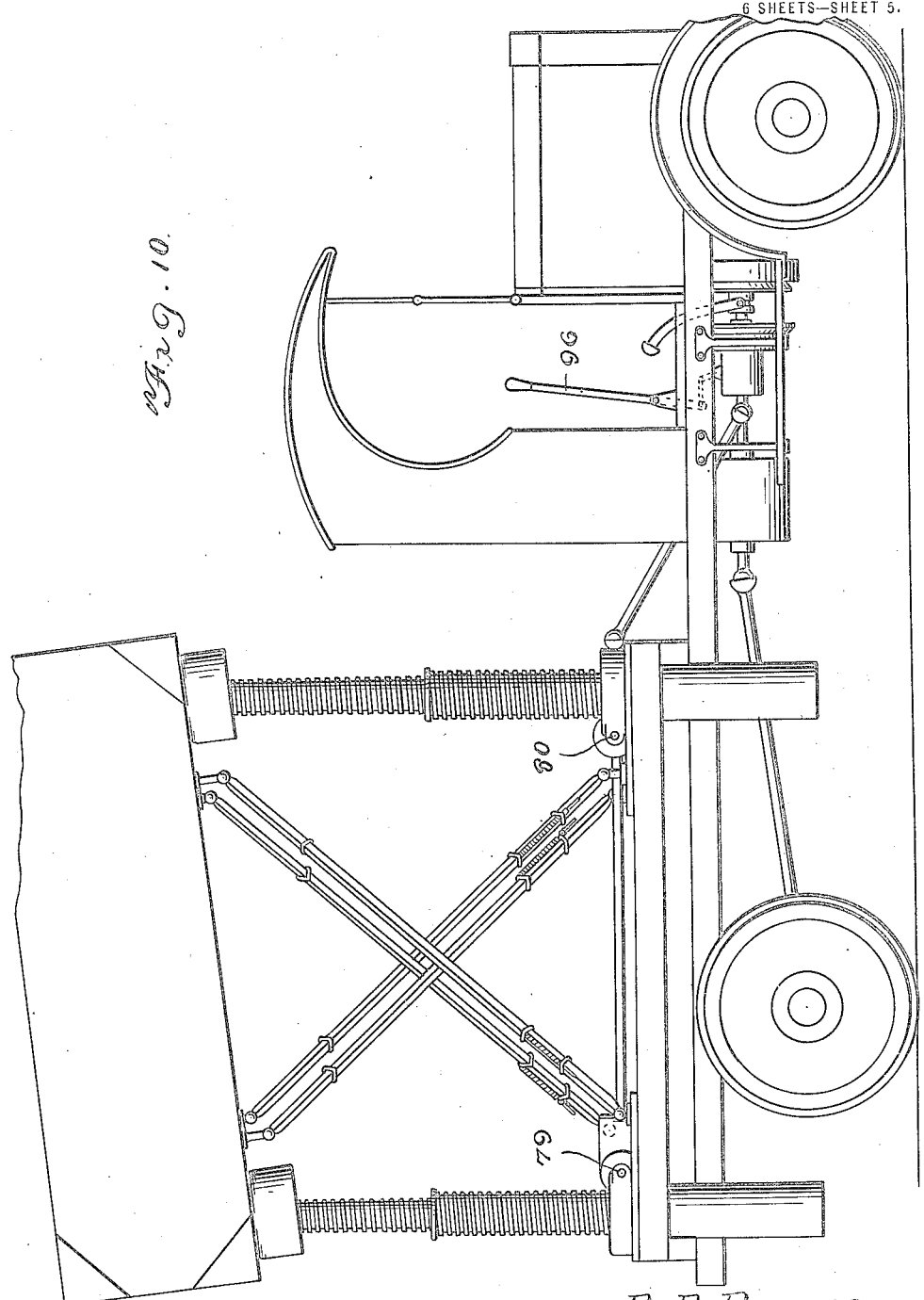

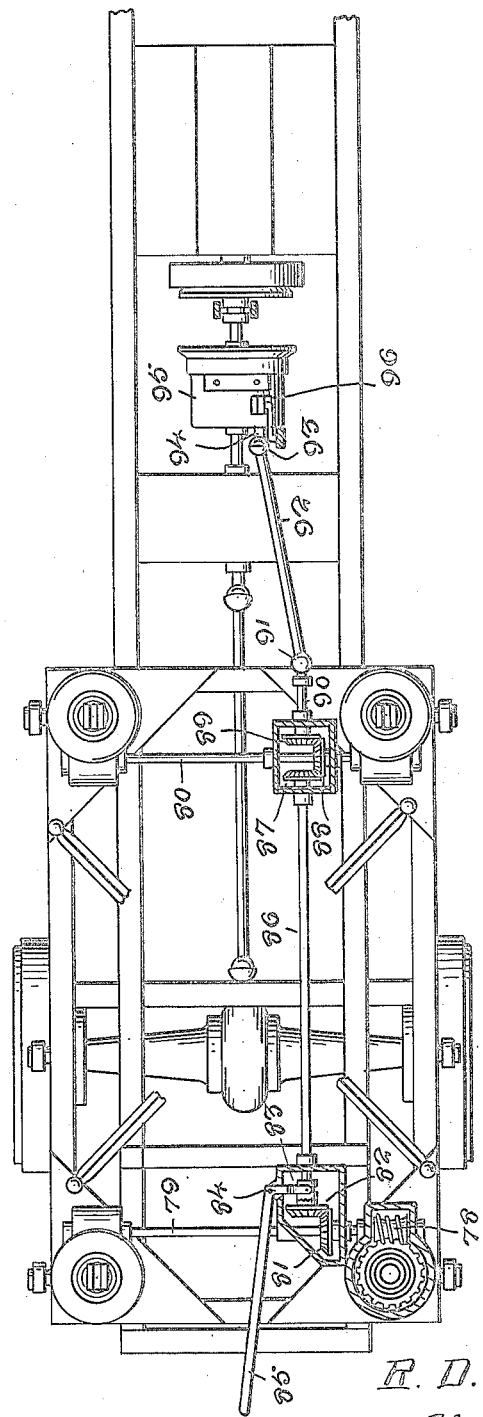

1,429,974

UNITED STATES PATENT OFFICE.

ROBERT D. ROGERS, OF JOHNSTOWN, PENNSYLVANIA, ASSIGNOR OF ONE-HALF TO GEORGE B. SOMERVILLE, OF JOHNSTOWN, PENNSYLVANIA.

DUMPING TRUCK.

Application filed December 18, 1920. Serial No. 431,637.

*To all whom it may concern:*

Be it known that I, ROBERT D. ROGERS, a citizen of the United States, residing at 984 Franklin Street, city of Johnstown, in the county of Cambria and State of Pennsylvania, have invented new and useful Improvements in Dumping Trucks, of which the following is a specification.

This invention relates to vehicles, particularly to motor vehicles, and has for its object the provision of a novel truck body mounting so constructed that the body may be elevated and subsequently tilted in a desired direction whereby to discharge its contents, the device being designed particularly for use in loading coal taken from the mines in the coal cars and obviating any necessity for shoveling or otherwise manually handling the coal, though it is to be readily understood that the device is not limited to such use but is capable of employment in a wide variety of capacities.

An important object is the provision of a device of this character which is provided with motor driven means for elevating the body to the desired height and subsequently tilting it to discharge the contents, this operating mechanism being driven by the truck motor and having independent control means for regulating the elevating and tilting movement separately.

Another object is the provision of novel elevating means consisting of a plurality of screw members interengaged and co-related and all telescoping when in inoperative position.

A further object is the provision of novel automatically engaging brace members which will operate to prevent accidental downward movement of the body during the elevating operation but which are releasable whereby to permit descent of the body after its load is discharged.

A still further object is the provision of a device of this character with which is associated peculiar means for initially leveling the body prior to its elevation so as to insure it against accidental tilting.

An additional object is the provision of a device of this character which will be comparatively simple in construction and operation, easy to control, a great labor saver in use, durable and efficient in service, and a general improvement in the art.

With the above and other objects and advantages in view, the invention consists in the details of construction to be hereinafter more fully described and claimed and illustrated in the accompanying drawings in which—

Figure 1 is a side elevation of one form of my invention, showing the truck body in lowered position by full lines and in elevated position by dotted lines, Figure 2 is a plan view of the chassis with the body itself removed, one elevating member being shown in section, Figure 3 is a rear elevation, showing the body elevated and tilted to one side, Figure 4 is a fragmentary elevation of one of the inclined brace members, Figure 5 is a view similar to Figure 4 but showing certain of the parts in different positions, Figure 6 is a cross sectional view through one of the brace members, Figure 7 is a vertical sectional view through one of the elevating screw devices, Figure 8 is a detail side elevation of the transmission mechanism for operating the elevating screws, Figure 9 is a horizontal sectional view through the transmission mechanism, Figure 10 is a side elevation showing a modified form of my invention in which the body is tipped rearwardly, and Figure 11 is a plan view thereof with the body removed and portions being in section.

Referring more particularly to the drawings, the letter A designates a motor truck chassis including the usual frame bars B and having the ordinary axle and wheel construction. The letter C designates the drive shaft of the truck which is thrown into or out of operation by means of the clutch pedal D. The letter E designates the truck body proper which may be of any desired shape, size, or capacity and of any suitable construction, such details not affecting the principle of the invention.

In carrying out my invention I provide an auxiliary frame including bars 15 suitably secured together and constituting a frame of substantially the same size as the body E. Associated with the frame bars B and the bars of the frame 15 are leveling screws 16, the purpose of which will be hereinafter made apparent. Secured to and depending from the auxiliary frame 15 are casings 17, four in number, arranged preferably at the corners of the frame 15. At their upper portions these casings 17 are enlarged, as shown at 18, and formed with attaching feet 19 rigidly bolted onto the frame 15. Secured upon the underside of the body E at the corners thereof are inverted cup members 20 within which are formed spaced ears 21.

Disposed within each depending casing 17 is an elevating screw device which comprises a central screw 22 having its upper end formed with an ear 23 disposed between the ears 21 and pivotally connected therewith by a pin 24 passing therethrough and through horizontally elongated slots 25 in the ears 21. This screw 22 is threaded through a sleeve 26 which is externally as well as internally threaded and which terminates at its upper and lower ends in flanges 27 and 28, respectively. It should also be stated that the lower end of the screw 22 is formed with an outwardly extending flange 29. Arranged concentrically of the member 26 are similar members 30, 31 and 32 which are all externally and internally threaded and which are all provided at their upper ends with flanges and at their lower ends likewise with flanges. The bore of each of the threaded sleeves is not threaded throughout its length but has the lower portion of its bore enlarged, as shown at 33, whereby to provide a series of shoulders 34 which are adapted to be engaged by the flanges at the lower ends of the next outermost sleeves. Located within the enlarged portion 18 at the upper end of each casing 17 is a worm wheel 35 rotatable upon roller bearing or ball bearings 36 at the bottom part of the casing extension or enlargement and this worm wheel is threaded onto the outermost sleeve member 32, as clearly shown in Figure 7. It will be seen that when the worm wheel 35 is rotated the outermost sleeve member will be caused to travel upwardly until the outwardly extending flange at the bottom thereof engages against the lower end of a depending sleeve 37 carried by the worm wheel. When this occurs the outermost sleeve 32 will be locked with respect to the worm wheel 35 and will rotate therewith whereupon the sleeve 31 will be moved upwardly until the flange at its lower end engages the shoulder 34 of the sleeve 32. This operation is the same for all of the threaded sleeve members and it will be apparent that after continued rotation of the worm wheel all of the normally telescoped screw and sleeve members will be extended which will result in moving the body E of the truck upwardly into the position shown by dotted lines in Figure 1.

Journaled in spaced parallel relation adjacent the sides of the auxiliary frame 15 are shafts 38, two in number, which extend through the casing enlargements 18 and which carry therewithin worms 39 meshing with the respective worm wheels 35.

In order to drive the shaft 38, I provide at some convenient point along the drive shaft between the fly-wheel and the rear axle a transmission casing 40 formed of a suitable number of sections properly secured together. Secured upon the drive shaft C within this casing 40 is an internal gear 41 having a relatively long hub portion 42 which terminates in a gear 43. Journaled within the casing 40 at the opposite sides of the drive shaft C are shafts 44 and 45 upon which are splined gears 46 and 47, respectively, movable into mesh with the internal gear 41 and carrying grooved collars 48 and 49, respectively. The gears 46 and 47 are also extended, at certain times, to be moved into mesh with the gear 43, as will be hereinafter explained. The shafts 44 and 45 are connected by universal joints 50 with diverging shafts 51 connected by universal joints 52 with the forward ends of the shafts 38. The casing 40 has its top portion provided with pairs of ears 53 between the pairs of which are journaled shifting forks 54 and 55 engaging the grooved collars 48 and 49, respectively. The forks 54 and 55 are connected by links 56 with independently movable levers 57 pivoted upon the truck frame within convenient reach of the operator.

Disposed between the auxiliary frame 15 and the body E are diagonally arranged brace members which include sections 58 pivoted upon the frame 15, as shown at 59, and sections 60 pivoted to the body E, as shown at 61. These sections are V-shaped in cross section and slidably and conformingly engage. Secured upon the lower ends of the sections 60 are triangular shaped guides 62 from which extend posts 63 upon the free ends of which is pivoted a swinging triangular yoke 64. The yoke 64 terminates at its corner opposite its pivots with an eye 65 through which extends a bolt or rod 66 which extends through an eye 76 on the support 62. A coil spring 68 surrounds this bolt or rod between the support 62 and yoke 64. The lower end of the rod 66 is pivotally connected, as shown at 69, with a cam lever 70 having an elongated handle 71 to which is connected a flexible member 72. When the device is ready to be used the parts are in the position shown in Figure 4.

It is necessary, before elevating the truck body, that the body be leveled and in order to accomplish this I provide near the corners of the frame 15 pivoted tubular sockets 73 within which are screwed rods 74 having feet 75. These feet 75 are engageable with the ground or other surface traveled over by the truck and it is intended that the rods 75 be rotated to move them into or out of the tubular sockets 73 whereby to level the frame 15 irrespective of the position of the truck frame A. Pivoted upon the frame 15 are pendulums 76 which move over arcuate scales 77 whereby to determine when the truck body and frame 15 are level. I provide one of these pendulum devices at each side and one at the rear of the frame 15.

The operation of the device is as follows:

Assuming that the body E is full of material to be dumped and also assuming that the truck is driven to the place where the dumping is to occur, it is first necessary to swing the members 73 and 74 downwardly to bring the feet 75 into engagement with the ground. The operator then adjusts the rods 74 until the pendulums 76 indicate that the truck body and frame 15 are perfectly level. The motor of the truck being in operation, the operator then shifts the levers 57 say rearwardly to swing the forks 54 and 55 rearwardly whereupon the gears 46 and 47 will be moved into mesh with the gear 43. Both of the shafts 44 and 45 and consequently the shafts 38 will then be rotated and the worms 39 will operate to turn the elevating devices operated by the worm wheels 35, as previously described. When the truck has been elevated to the desired height, and its desired to dump it, the operator grasps either of the levers 57 and pulls it forwardly which will result in disengaging the gear 46 or 47, as the case may be, from the gear 43. Only one of the shafts 44 or 45 and one shaft 38 will then be rotated which will result in operation of the elevating screws at one side of the truck only whereupon that side will be moved into a higher position than the other side so that the body will dump. As the body E is moved upwardly the telescopic brace members 58 and 60 will be extended, as clearly shown in Figure 3. As these sections slide upon each other it will be apparent that the yoke 64 thereof will positively prevent any retrograde tendency so that the body will be prevented from dropping in case of mishap to the elevating mechanism.

When it is desired to lower the body to normal position the operator pulls upon the flexible members 72 to release the locking cams 70 so that the springs 68 will operate to release the yokes 64 from their gripping action upon the braces so that the brace sections 58 and 60 will be free to slide upon one another. The operator then pushes both of the levers 57 forwardly as far as possible whereupon the gears 46 and 47 will be thrown into mesh with the internal gear 41 whereupon the shafts 44 and 45 and consequently the shafts 38 will be rotated in the direction opposite to that in which they are rotated when the body is elevated. The worms 39 cooperating with the worm wheels 35 will then cause all the threaded sleeves and screws of the hoisting mechanism to telescope so that the body E will descend into its normal position.

Referring to the form shown in Figures 10 and 11, it will be seen that I have provided a slightly different arrangement whereby the truck body is dumped rearwardly instead of to the side. In this form I make use of exactly the same elevating screws and worm wheels and identically the same construction of inclined brace bars as in the previous form. The driving mechanism for the elevating screws is, however, different. In this form the worms 78 which operate the worm wheels are mounted upon shafts 79 and 80 which are journaled transversely of the frame 15. The shaft 79 carries a bevel gear 81 meshing with a bevel gear 82 which carries a grooved collar 83 engaging with a shifting fork 84 having a handle 85. The gear 82 is secured upon a longitudinal shaft 86 which carries at its forward end a bevel gear 87 meshing with a bevel gear 88 on the shaft 80 and the gear 88 meshes with a bevel gear 89 on the short shaft 90 which is connected by a universal joint 91 with a shaft 92 connected by a universal joint 93 with a shaft 94 extending into a transmission casing 95 in which the mechanism is the same as that shown in Figure 9 except that there is only one auxiliary shaft corresponding to either the shaft 44 or the shaft 45. A shifting lever 96, identically the same as the lever 57, is employed for throwing the shaft 94 into operation.

In the operation of this form of the device it will be seen that when the shaft 94 is driven in one direction and the gear 82 is in mesh with the gear 81 all the hoisting screw members will be set in operation to elevate the truck body. When it is desired to dump the body the operator grasps the lever 85 and throws the gear 82 out of mesh with the gear 81 whereupon only the forward elevating screws will be operated which will result in tipping the body rearwardly into dumping position.

From the foregoing description and a study of the drawings it will be apparent that I have thus provided a simply constructed and mounted mechanism for elevating and dumping truck bodies, the device being designed particularly for use in loading coal from the mines into railroad cars but being equally well adapted for use for a wide variety of purposes.

While I have shown and described the preferred embodiments of my invention, it is of course to be understood that I reserve the right to make such changes in the form, construction, and arrangement of parts as will not depart from the spirit of the invention or the scope of the subjoined claims.

Having thus described my invention, I claim:

1. In combination with a truck chassis, the drive mechanism thereof and the truck body; means for elevating and tilting the body comprising an elevating screw device disposed beneath each corner of the body, means driven from the truck drive for operating said screw devices simultaneously, and means for driving two of the elevating devices alone.

2. In combination with a truck chassis, the drive mechanism thereof and the truck body; elevating and tilting means for the body comprising an elevating device located beneath each corner of the body and including a plurality of concentric telescopically engaged screw members, gearing for operating said screw devices, and means driven by the truck drive for simultaneously operating all of the screw devices or for operating two thereof alone.

3. In combination with a truck chassis, the drive mechanism thereof and the truck body; a screw elevating device disposed below each corner of the body and including a plurality of telescopically engaged and threadedly connected member, a worm wheel associated with each elevating device, a pair of shafts, worms on said shafts meshing with said worm wheels, and means for driving both or one of said shafts.

4. In combination with a truck chassis, the drive mechanism thereof and the truck body; a screw elevating device disposed below each corner of the body and including a plurality of telescopically engaged and threadedly connected members, a worm wheel associated with each elevating device, a pair of shafts, worms on said shafts meshing with said worm wheels, and means for driving both or one of said shafts comprising transmission means driven by the truck drive and clutch control devices associated with said transmission and with said shafts.

5. In combination with a truck chassis, the drive mechanism thereof and the truck body; a screw elevating device disposed below each corner of the body and including a plurality of telescopically engaged and threadedly connected members, and means whereby to operate two or all of said screw devices simultaneously.

6. In combination with a truck chassis, the drive mechanism thereof and the truck body; a screw elevating device disposed below each corner of the body and including a plurality of telescopically engaged and threadedly connected members, a worm wheel associated with each elevating device, and means driven by the drive mechanism of the truck whereby to operate two or all of said screw devices simultaneously.

7. In combination with a truck chassis, the drive mechanism thereof and the truck body; a screw elevating device disposed below each corner of the body and including a plurality of telescopically engaged and threadedly connected sections, a pair of shafts having operative connection with said elevating members whereby to operate the same, means for driving one of said shafts from the drive mechanism of the truck and means for driving both of said shafts from the mechanism of the truck.

In testimony whereof I affix my signature.

ROBERT D. ROGERS.